United States Patent [19]

Snow et al.

[11] Patent Number: 4,594,852

[45] Date of Patent: Jun. 17, 1986

[54] AIRCRAFT ENGINE CONTROL

[75] Inventors: Barton H. Snow, Wyoming; William W. Stockton, Cincinnati, both of Ohio

[73] Assignee: General Electric Company, Cincinnati, Ohio

[21] Appl. No.: 666,535

[22] Filed: Oct. 30, 1984

[51] Int. Cl.$^4$ .............................................. F02C 9/28
[52] U.S. Cl. ................................... 60/38.281; 60/243
[58] Field of Search ............................. 60/39.281, 243

[56] References Cited

U.S. PATENT DOCUMENTS

| 3,956,884 | 5/1976 | Eves | 60/39.281 |
| 4,159,625 | 7/1979 | Kerr | 60/243 |
| 4,380,148 | 4/1983 | Burrage | 60/243 |
| 4,423,592 | 1/1984 | Evans | 60/39.281 |

Primary Examiner—Louis J. Casaregola
Attorney, Agent, or Firm—Gregory A. Welte; Derek P. Lawrence

[57] ABSTRACT

In the present invention, fuel flow in an aircraft is modulated automatically in order to maintain a preselected altitude.

6 Claims, 2 Drawing Figures

AIRCRAFT ENGINE CONTROL

The Government has rights in this invention pursuant to Contract No. F33657-70-C-0801 awarded by the Department of the Air Force.

The present invention relates to a fuel control for aircraft and, more specifically, to the type used in terrain-following aircraft.

BACKGROUND OF THE INVENTION

Some aircraft contain controls, which are often called "automatic pilots," which maintain the aircraft at a constant air speed. When the aircraft's altitude is about to change, as when approaching a mountain or a valley, the control varies the engine speed in order to compensate for the impending change in altitude. It should be noted that if it becomes necessary to fly over a mountain during terrain following, more power (greater fan speed) is needed.

OBJECTS OF THE INVENTION

It is an object of the present invention to provide a new and improved aircraft engine control.

It is a further object of the present invention to provide a new and improved aircraft engine control for use in terrain-following aircraft.

It is a further object of the present invention to provide an aircraft engine control which, when used for terrain following, maintains a selected elevation above ground level.

SUMMARY OF THE INVENTION

In one form of the present invention, fuel flow in an aircraft is modulated automatically in order to maintain a preselected altitude.

DETAILED DESCRIPTION OF THE INVENTION

Figure 1:
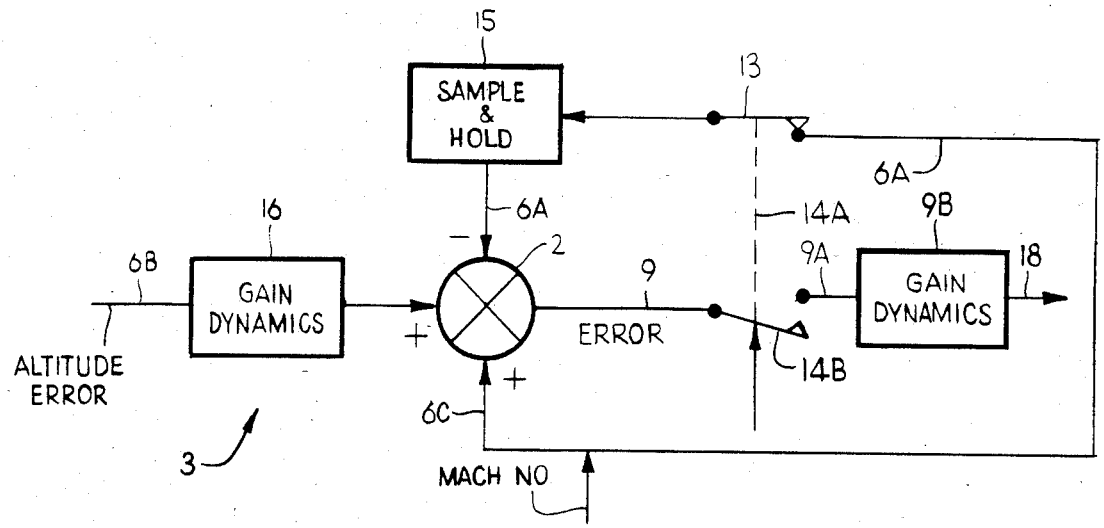
FIGS. 1 and 2 schematically depict one form of the present invention.

FIG. 1 illustrates a summer 2 in an aircraft flight control computer 3. The summer 2 receives inputs along lines 6A–C. The input on line 6B is an altitude error signal ("ΔALT"). This signal is derived from equipment known in the art and indicates the difference between a preselected, reference altitude and the actual altitude of the aircraft. The actual altitude can be determined with reference to the terrain directly beneath the aircraft, or with reference to the terrain at a predetermined distance to the front of the aircraft, say 5,000 yards. In either case, the altitude error is based on either the present or a projected altitude above ground level (i.e., a reference level) and the preselected, desired level.

The signal on line 6C is indicative of Mach number ("MACH") and, again, equipment known in the art derives the Mach number signal. This signal is indicative of the actual Mach number of the aircraft.

The signal on line 6A is a preselected Mach number which is stored in the sample and hold circuit 15 to be retained as a reference. The output of the summer 2 is present on line 9. This signal represents the Mach error as the difference between actual Mach and the desired value stored in the sample and hold 15. The altitude error, with suitable gains and dynamics, indicated by block 16, permits a transient increase or decrease in engine speed to aid in close following of the terrain. A switch 14, which is connected to switch 13 as indicated by dashed line 14A, opens switch 13 when switch 14 is closed. When switch 13 is opened, the value of the flight Mach at that instant is retained as a reference as the desired flight Mach number. When switch 14 is closed, the reference signal on line 9 (i.e., the sum of signals on lines 6A–C) is applied to line 9A.

The three signals on lines 6A–C are added in summer 2 in order to provide a reference signal on line 9, which is the output of the summer 2. By the action of summer 2, the reference signal indicates the cumulative errors in altitude and Mach number. As explained, the error signal 9A is basically a Mach error. The gain and dynamics circuit 9B converts this error to an engine fan rpm error by considering the size of the signal and the thrust change, and therefore the fan speed change necessary to reduce the Mach error 9A to a minimum in a reasonable time, without undue cycling of the engine(s) or the flight Mach. This conversion is a single gain and dynamics function. The reference signal 18 can be termed a Conditioned Thrust Demand (CTD) signal.

Figure 2:
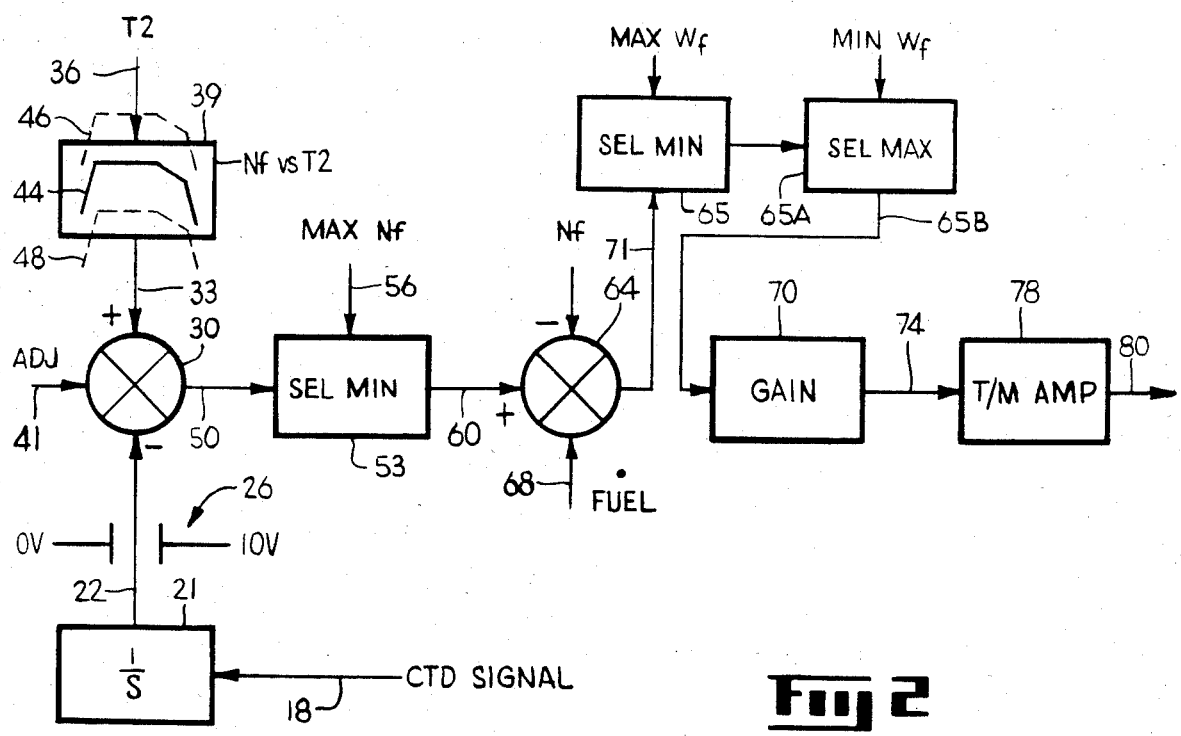

As shown in FIG. 2, a CTD signal is applied to line 18. This signal may be the reference signal provided on line 9 in FIG. 1, or it may be one which is similar in the respect that it indicates an error between some aspect of aircraft performance, such as rpm, altitude or Mach number, and a performance reference. In either case, the term Conditioned Thrust Demand (CTD) signal will refer to an aircraft performance error signal, and it need not necessarily be the exact type produced on line 9 in FIG. 1.

The CTD signal on line 18 in FIG. 2 is integrated by integrator 21 (indicated by the LaPlace Transform symbol 1/S) to produce an integrated CTD signal on line 22. A limiter 26 limits the excursion of the signal on line 22 within a predetermined range, such as between zero and 10 V as indicated. As will be better understood later, the limiter 26 limits the authority of the CTD signal in affecting engine speed, thereby limiting size of the speed excursions of the engine. The limited signal on line 26 is fed to a summer 30 where it is subtracted from the signal on line 33 as indicated by negative and positive signs next to the summer 30. The signal on line 33 will now be considered.

A signal on line 36 is provided by equipment which is not shown and which is known in the art which is indicative of an engine temperature designated T2. T2 is the temperature of the inlet air to the engine. T2 is fed to scheduling block 39. The scheduling block 39 functions to provide a signal on line 33 indicative of the maximum fan speed (fan speed is termed "Nf") allowed for the particular T2 present on line 36. Restated, scheduling block 39 is a function generator which provides a signal on line 33 as a function of T2, as shown by the plot line 44.

Line 41, labeled ADJ, applies an adjustment signal to the summer 30. The adjustment signal, in effect, raises or lowers the function generated by block 39 as shown by dashed plot lines 46 and 48. ("Raising" means that, for a given T2, the value of Nf provided by the block 39 is greater than the value corresponding to the solid plot line 44. "Lowering" means that the Nf provided is less.) The adjustment signal allows accommodation of engine to engine variations and performance.

The output of summer 30, on line 50, is applied to a minimum selector block 53 which compares the signal on line 50 with a maximum fan speed (MAX Nf) signal carried by line 56 and which is determined in advance, by the engine designer. The output of the MIN selector 53, on line 60, is thus indicative of the presently demanded speed, but subject to the following: the maximum speed on line 56, the maximum speed generated by function generator 39, and the range created by limiter 26.

The demanded speed signal on line 60 is fed to a second summer 64 in which fan speed, Nf, is subtracted as indicated by a negative sign. The demanded speed signal on line 60 as modified by summer 64 (that is, an error speed signal) is fed to MIN and MAX selectors 65 and 65A in sequence to impose other engine limits which are calculated by means known to the state of the art. Maximum acceleration and minimum deceleration fuel flow are examples of such limits.

The first time derivative of fuel flow, on line 68, is also subtracted in second summer 64. This has the effect of comparing the desired fuel valve position (on line 60) with the first time derivative of the engine fuel valve aperture (that is, the rate of change of fuel flow, designated as FUEL-dot in FIG. 2). The subtraction of the fuel valve rate provides a stabilizing loop as indicated by line 68 to inhibit overshoot of the fuel valve aperture size.

The output of MAX block 65A is fed to amplifier 70 by line 65B to provide an amplified, stabilized, demanded speed error signal on line 74 which is fed to torque motor amplifier 78. Torque motor amplifier 78 provides a signal on line 80 which is fed to a torque motor/fuel valve system which is known in the art. It is believed sufficient to state here that the torque motor/fuel valve system opens the fuel valve aperture (the aperture is not specifically shown) to thereby control the amount of fuel delivered to the engine as a function of the signal present on line 80.

Several important aspects of the functioning of the present invention will now be discussed. Subtraction of the integrated CTD signal (line 22) from the fan speed limit (line 33) within summer 30 has the effect of setting the throttle at maximum, and modulating the throttle by the integrated CTD signal (line 22). Restated, throttle is set at maximum (actually at the maximum Nf programmed into block 39 for the currently detected T2) and then reduced by the integrated sum of the errors in Mach number, engine speed, and altitude.

Another important aspect of the present invention lies in the switches 13 and 14. When switch 13 is closed, switch 14 is thus open, and so no signal is subtracted from summer 30 by line 22. However, when switch 14 is closed, switch 13 becomes opened, thus storing the current Mach number in S/H 15, and applying the integrated sum of the error signals carried by lines 6A-C to line 18 in FIG. 2. At this time, the integrated signal on line 22 is subtracted from summer 30.

Restated, when switch 14B is closed and switch 13 is opened, the signal on line 6A equals that on line 6C. Also, at this time, the signal on line 6B equals zero. Thus, no change in fuel flow occurs at this instant. However, if a change in altitude occurs, a signal on line 6B alters the CTD signal, thus changing the signal of line 74 in FIG. 2.

An invention has been described which modulates engine power for terrain-following aircraft. Numerous substitutions and modifications can be undertaken without departing from the true spirit and scope of the invention. What is desired to be secured by Letters Patent is the invention as defined in the following claims.

We claim:

1. In a fuel control system in an aircraft which includes means (64) for comparing a presently demanded speed signal with an actual speed signal of a component of the engine, the improvement comprising:
   (a) scheduling means for generating a signal indicative of a maximum allowable speed (MAX Nf) of the engine component as a function of the temperature (T2) of a predetermined, other engine component;
   (b) means for modifying the MAX Nf signal as a function of a Conditioned Thrust Demand (CTD) signal, which is a signal indicative of a deviation of an aspect of aircraft performance from a predetermined reference, in order to produce the presently demanded speed signal, the means including
      (i) an integrator for receiving the CTD signal and integrating the signal received, and
      (ii) switching means for selectively removing the influence of the CTD signal from the scheduling means.

2. An aircraft engine control, comprising:
   (a) means for generating a Conditioned Thrust Demand (CTD) which indicates the deviation of at least one aspect of aircraft performance from a reference;
   (b) an integrator for taking the time integral of the CTD signal;
   (c) means for deriving a signal (MAX Nf) indicative of a maximum speed allowable for a predetermined engine component;
   (d) means for modulating the MAX Nf signal as a function of the CTD signal;
   (e) means for modulating fuel flow as a function of the modulated signal of (d), and
   (f) switching means for selectively preventing the modulation of the MAX Nf signal of (d).

3. In a system for use in modulating the fuel delivered to a turbofan aircraft engine, the improvement comprising:
   (a) means for generating a Conditioned Thrust Demand (CTD) signal which is indicative of one or more of the following:
      (i) the error between a desired altitude and the actual altitude of the aircraft,
      (ii) the error between a desired Mach number and the actual Mach number of the aircraft;
   (b) means for taking the time integral of the CTD signal;
   (c) means for generating a signal (MAX Nf) indicative of the maximal allowable engine fan speed as a function of the temperature (T2) of a predetermined engine component;
   (d) means for adding the integrated CTD signal with MAX Nf to produce a demanded speed signal;
   (e) second adder means for adding at least the following signals:
      (i) a signal (Nf) indicative of an actual engine speed,
      (ii) a signal indicative of the time derivative of fuel valve movement, and
      (iii) the demanded speed signal; and
   (f) fuel delivery means for receiving the second summed signal of (e) and modifying the fuel delivery rate to the engine as a function of the magnitude of the second summed signal.

4. A system for controlling the fuel delivered to an aircraft engine comprising:
   (a) aircraft data computer means which includes
      (i) means for developing an error signal (ΔALT) indicative of the deviation of the aircraft altitude and a reference altitude,
      (ii) means for developing an error signal (ΔMACH) indicative of the deviation of the aircraft Mach number and a reference Mach number, and
      (iii) summing means (2) for adding the two error signals of paragraphs (i) and (ii) to provide a Conditioned Thrust Demand (CTD) signal;
   (b) integration means (21) for receiving the CTD signal and integrating it in order to provide an integrated CTD signal;
   (c) first limit means (26) for limiting excursions of the integrated CTD signal within a predetermined range;
   (d) function generation means (39) for providing a signal indicative of a maximum fan speed (MAX Nf) as a predetermined function of the temperature (T2) of a predetermined engine component;
   (e) second adder means (30) for subtracting the limited CTD signal from MAX Nf in order to produce a preliminary speed demand signal;
   (f) second limiting means (53) for limiting the preliminary speed demand signal to a predetermined maximum in order to provide a demanded speed signal;
   (g) third adder means (64) for
      (i) subtracting a signal indicative of the first time derivative of the aperture of the engine fuel valve from the demanded speed signal and
      (ii) subtracting a signal indicative of fan speed from the demanded speed signal in order to produce a fuel valve modulation signal; and
   (h) means for modulating fuel flow as a substantially linear function of the flow modulation signal.

5. A system according to claim 4 in which the Conditioned Thrust Signal (CTD) is fed to all of the engines on an aircraft.

6. A system according to claim 4 in which the Conditioned Thrust Signal (CTD) represents a desired difference between multiple engines so that the aircraft can be steered by thrust change to supplement or replace rudder change.

* * * * *